(12) United States Patent
Carmi

(10) Patent No.: US 7,894,576 B2
(45) Date of Patent: Feb. 22, 2011

(54) SPECTRAL COMPUTED TOMOGRAPHY USING CORRELATED PHOTON NUMBER AND ENERGY MEASUREMENTS

(75) Inventor: Raz Carmi, Haifa (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 46 days.

(21) Appl. No.: 12/516,599

(22) PCT Filed: Nov. 13, 2007

(86) PCT No.: PCT/IB2007/054610

§ 371 (c)(1),
(2), (4) Date: May 28, 2009

(87) PCT Pub. No.: WO2008/065564

PCT Pub. Date: Jun. 5, 2008

(65) Prior Publication Data

US 2010/0027738 A1    Feb. 4, 2010

Related U.S. Application Data

(60) Provisional application No. 60/867,856, filed on Nov. 30, 2006.

(51) Int. Cl.
*H05G 1/64* (2006.01)
*G01N 23/087* (2006.01)
(52) U.S. Cl. ............... 378/98.9; 378/5; 250/370.09
(58) Field of Classification Search ............. 378/5, 378/98.9; 250/363.07, 370.09
See application file for complete search history.

(56) References Cited

U.S. PATENT DOCUMENTS

| 4,181,855 | A | * | 1/1980 | Horrocks | 250/363.01 |
| 4,535,242 | A | * | 8/1985 | Dirkse et al. | 250/363.07 |
| 4,612,443 | A | * | 9/1986 | Alcidi | 250/362 |
| 4,893,015 | A |   | 1/1990 | Kubierschky et al. | |
| 5,210,423 | A |   | 5/1993 | Arseneau | |
| 6,525,323 | B1 | * | 2/2003 | Vesel et al. | 250/369 |
| 6,759,658 | B2 | * | 7/2004 | Overdick et al. | 250/336.1 |
| 6,901,337 | B2 | * | 5/2005 | Tanaka et al. | 702/60 |

(Continued)

FOREIGN PATENT DOCUMENTS

| EP | 0166169 A2 | 1/1986 |
| EP | 1231485 A2 | 8/2002 |

OTHER PUBLICATIONS

Han, L., et al.; A VLSI Design for Energy Extraction and Pileup Prevention for High Count-Rate Scintillation Signals; 2004; IEEE Trans. on Nuclear Science Symposium Conf.; vol. 4:2374-2378.

(Continued)

*Primary Examiner*—Edward J Glick
*Assistant Examiner*—Thomas R Artman

(57) ABSTRACT

A computed tomography system includes a plurality of radiation sensitive detector elements (100) which generate a time varying signal indicative of x-ray photons received by the various detector elements (100). Photon counters (24) count the photons received by the various detector elements (24). Event-driven energy determiners (26) measure the total energy of the received photons. A mean, energy calculator (46) calculates a mean energy of the photons received by the various detector elements (100) during a plurality of reading periods.

23 Claims, 6 Drawing Sheets

U.S. PATENT DOCUMENTS

| | | | | |
|---|---|---|---|---|
| 6,936,822 B2* | 8/2005 | Wong et al. | ............ | 250/363.09 |
| 7,149,278 B2* | 12/2006 | Arenson et al. | ............... | 378/19 |
| 7,439,515 B2* | 10/2008 | Bak | ........................... | 250/369 |
| 2006/0056576 A1 | 3/2006 | Hoffman et al. | | |
| 2010/0078569 A1* | 4/2010 | Jarron et al. | ........... | 250/363.04 |

OTHER PUBLICATIONS

Kraft, E., et al.; Counting and Integrating Readout for Direct conversion X-ray Imaging-Concept, Realization and First Prototype Measurements; 2005; vol. 5:2761-2765.

* cited by examiner

SPECTRAL COMPUTED TOMOGRAPHY USING CORRELATED PHOTON NUMBER AND ENERGY MEASUREMENTS

CROSS REFERENCE TO RELATED APPLICATIONS

This application claims the benefit of U.S. provisional application Ser. No. 60/867,856 filed Nov. 30, 2006, which is incorporated herein by reference.

The present application relates to the field of spectral computed tomography (CT). It also relates to the detection of x-rays and other radiation where it is desirable to obtain information regarding the energy of the detected radiation. It finds particular application in medical imaging, and also has application in non-destructive testing and analysis, security applications, and other applications where energy discrimination capabilities are useful.

While conventional CT systems have provided image data representative of the x-ray attenuation of an object under examination, such systems have been limited in their ability to provide information about the material composition of the object, especially where different materials have had similar radiation attenuations. Improving the material separation capability of a CT system can, however, be useful in a number of applications. In medical applications, for example, it may be desirable to distinguish between various tissue types, to distinguish tissue from contrast agent, and the like. As another example, information on the composition of a sample can simplify the inspection task in security applications.

One way to obtain material composition information is to measure the energy of the detected radiation, for example through the use of photon counting detectors. Exemplary photon counting detectors include scintillator-based detectors such as those based on lutetium orthosilicate ($Lu_2SiO_5$ or LSO), bismuth germanate (BGO) and sodium iodide (NaI) together with a photodetectors such as photodiodes or photomultiplier tubes (PMTs). Still other scintillator materials such as lanthanum bromide (LaBr), $LuI_3$, $Gd_2SiO_5$ (GSO), $LuAlO_3$ (LuAP) and $YAlO_3$ (YAP) are also known. Cadmium zinc telluride (CZT) based detectors are an example of direct conversion photon counting detectors.

Unfortunately, however, photon counting techniques are not particularly well-suited for use over the count rates and input dynamic ranges typically encountered in CT and other x-ray applications. One technique for addressing this issue is described in Kraft, et al., *Counting and Integrating Readout for Direct Conversion X-ray Imaging Concept, Realization and First Prototype Measurements*, 2005 IEEE Nuclear Science Symposium Conference Record, which discloses a counting and integrating pixel (CIX) structure for use with CZT detectors. A photon counter counts the photons received by a detector pixel during a reading period. An integrator simultaneously integrates the total signal current over the reading period. According to the paper, the described technique extends the available dynamic range beyond the limits of photon counting and integration techniques taken individually, and also yields spectral information in terms of mean photon energy in the region where the operating ranges of the photon counting and integration regimes overlap.

Nonetheless, there remains room for improvement. More particularly, it remains desirable to provide improved techniques for obtaining spectral information in CT and other x-ray detection systems.

Aspects of the present application address these matters and others.

According to a first aspect, an apparatus includes an x-ray detector which generates a signal having a magnitude which varies in response to x-ray photons received by the detector, a photon counter which counts x-ray photons received by the detector during a reading period, and a photon energy determiner which generates an output which represents a total of the changes in the magnitude of the detector signal in response to x-ray photons received by the detector during the reading period.

According to another aspect, a method includes detecting an x-ray photon received by an x-ray detector element of an x-ray computed tomography apparatus, counting the detected photon, measuring an energy of the detected photon. The measurement is performed in response to the detection of the photon. The method also includes repeating the steps of detecting, counting, and measuring during a reading period and generating an output indicative of the number and total energy of the photons received by the detector element during the reading period.

According to another aspect, an x-ray computed tomography apparatus includes an object support which supports an object under examination in an examination region, an x-ray source which generates x-rays from a plurality of positions about the examination region, an x-ray sensitive detector element which generates a time varying signal in response to x-ray photons received by the detector element, a photon counter which counts x-ray photons received by the detector element during a reading period, and a photon energy determiner which measures a total energy of the counted x-ray photons. The photon energy determiner measures a change in the detector signal during each of a plurality of sub-periods of the reading period.

Still further aspects of the present application will be appreciated by those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
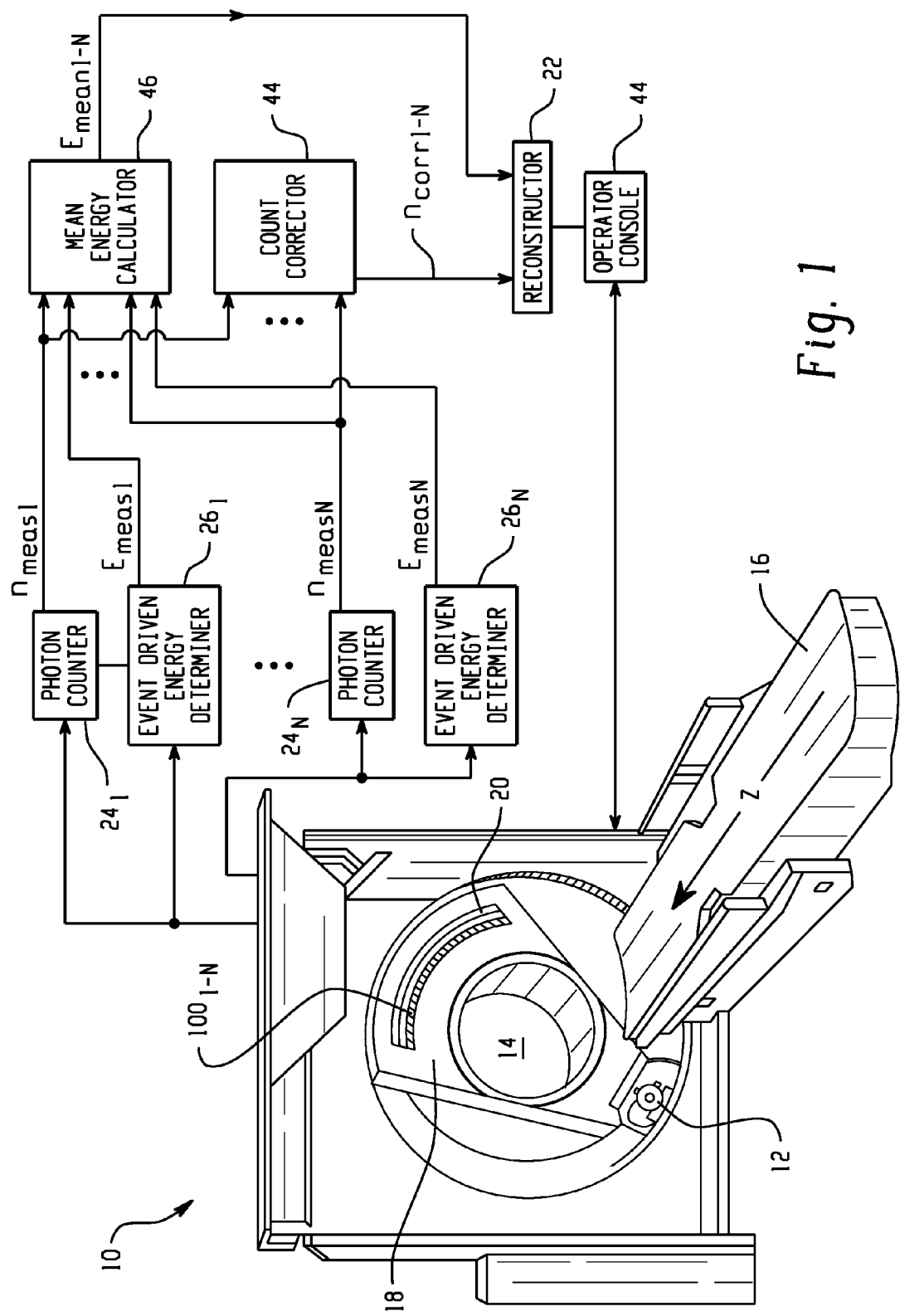
FIG. 1 depicts a CT system.

With reference to FIG. 1, a CT scanner 10 includes a rotating gantry 18 which rotates about an examination region 14. The gantry 18 supports an x-ray source 12 such as an x-ray tube. The gantry 18 also supports an x-ray sensitive detector 20 which subtends an arc on the opposite side of the examination region 14. X-rays produced by the x-ray source 12 traverse the examination region 14 and are detected by the detector 20. Accordingly, the scanner 10 generates projection data indicative of the radiation attenuation along a plurality of projections or rays through an object disposed in the examination region 14.

Depending on the configuration of the scanner 10 and the detector 20, the x-ray source 12 generates a generally fan, wedge, or cone shaped radiation beam which is approximately coextensive with the coverage of the detector 20.

Moreover, so-called fourth generation scanner configurations in which the detector 20 spans an arc of 360 degrees and remains stationary while the x-ray source 12 rotates about the examination region may also be implemented. The use of flat panel, single slice, or other detector configurations is also contemplated.

The detector 20 includes a plurality of detector elements or pixels $100_1 \ldots 100_N$ which are implemented as CZT, scintillator coupled to a photosensitive device or other photon counting detectors. A plurality of photon counters $24_1 \ldots 24_N$ and event-driven energy determiners $26_1 \ldots 26_N$ receive signals generated by the various detector elements $100_1 \ldots 100_N$. The various photon counters $24_{1-N}$ generate outputs $n_{meas1-N}$ indicative of the number of photons received the corresponding detector element $100_{1-N}$ and which satisfy one or more counting criteria, while the event-driven energy determiners 26 generate outputs $E_{meas1-N}$ indicative of the measured energy of the counted photons. The outputs $n_{meas1-N}$ and $E_{meas1-N}$ are generated for each of a plurality of reading periods corresponding to various projection angles about the examination region 14. As will be described further below, the energy measurement can be viewed as an event driven process which is synchronized with the detection of photons by the respective detector elements 100. More particularly, the energy measurements represent the sum of the rise-signal net magnitudes of the photons detected during a given reading period.

A mean energy calculator 46 uses the various count data $n_{meas1-N}$ and $E_{meas1-N}$ to calculate mean energy $E_{mean1-N}$ for the various detector channels and reading periods, with the data stored in a suitable memory or memories or otherwise provided to the reconstructor 22. A count corrector 44 applies pileup or other desired corrections to the measured count data $n_{meas1-N}$ generated by the channels during the various reading periods so as to generate corrected counts $n_{corr1-N}$.

The reconstructor 22 reconstructs the projection data to generate volumetric data indicative of the interior anatomy of the patient. In addition, the energy information is used (before reconstruction, after reconstruction, or both) to provide information about the material composition of the object under examination. Note that the photon number data and the total energy data may be reconstructed separately without reference to the mean energy data, with information extracted from the two different image sets used in a post processing operation. In such an implementation, the mean energy calculator 46 may be omitted.

An object support 16 such as a couch supports a patient or other object in the examination region 14. The support 16 is preferably movable in coordination with a scan in order to provide a helical, axial, circle and line, or other desired scanning trajectory.

A general purpose computer serves an operator console 44. The console 44 includes a human-readable output device such as a monitor or display and an input device such as a keyboard and/or mouse. Software resident on the console allows the operator to control the operation of the scanner by establishing desired scan protocols, initiating and terminating scans, viewing and otherwise manipulating the volumetric image data, and otherwise interacting with the scanner 10.

Figure 2:
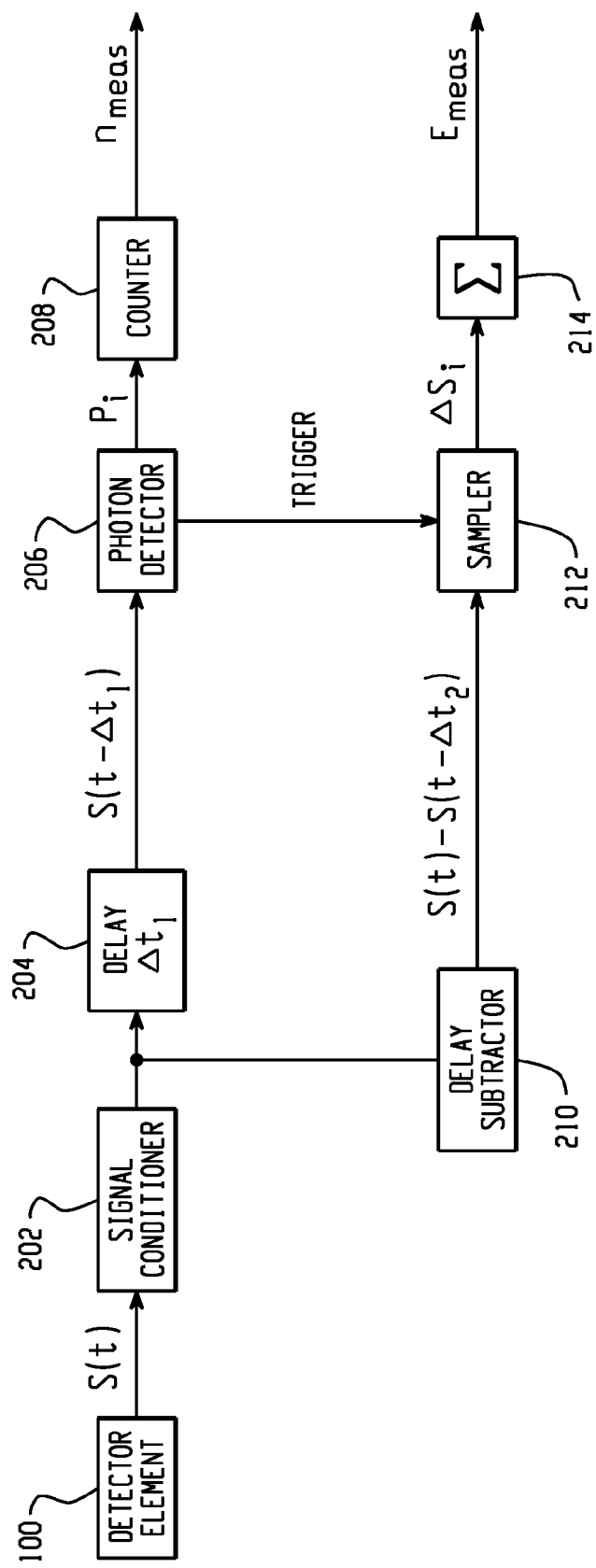
FIG. 2 is a functional block diagram of a detector channel.

FIG. 2 depicts an exemplary detector channel in greater detail. As will be appreciated, the detector element 100 generates a time varying signal S(t) having a magnitude which varies in response to x-ray photons received by the detector element 100. A signal conditioner 202 such as a pre-amplifier and signal shaper or filter conditions the detector signal, for example to provide a desired signal level and/or to reduce the effects of noise. A first time delay element 204 delays the detector signal by a first delay time $\Delta t_1$ so as to generate a time delayed detector signal $S(t-\Delta t_1)$. A photon detector 206 receives the time-delayed detector signal and detects the various photons $P_i$ received by the detectors element 100 and which comply to certain conditions in order to be counted, for example by detecting rises in the signal $S(t-\Delta t_1)$ which are indicative of detected photons. A detection threshold may also be used to reduce false counts due to noise. The photon detector 206 also generates a trigger signal in response to the detection of a photon $P_i$. A counter 208 counts the photons $P_i$ to generate an output $n_{meas}$ indicative the number of photons detected during a reading period.

A detector signal change determiner such as a delay-subtractor 210 likewise receives the detector signal S(t) and generates an output signal indicative of the magnitude of the change in the detector signal during a second time period $\Delta t_2$:

$$\Delta S = S(t) - S(t-\Delta t_2) \qquad \text{Equation 1}$$

In response to the trigger signals generated by the photon detector 206, a signal sampler 212 such as a sample and hold unit samples the output of the delay-subtractor 210 to generate sampled signals $\Delta S_i$ corresponding to the various photons $P_i$. A summer 214 sums the sampled signals to generate an output $E_{meas}$ indicative of the energy of the photons $P_i$ detected during the reading period:

$$E_{meas} = \sum_{i=1}^{n} \Delta S_i \qquad \text{Equation 2}$$

where n is the number of photons detected during the reading period.

Following each reading period, the photon count $n_{meas}$ and energy $E_{meas}$ the counter 208 and summer 214 are reset for the next reading.

Returning now to FIG. 1, the count corrector 44 applies a pile-up correction to the various measured count values $n_{meas}$ for each channel to generate corresponding corrected count values $n_{corr}$. The correction can be accomplished using a correction transfer function, a look up table, or other known techniques. The mean energy calculator 46 uses the measured counts $n_{meas}$ and energy $E_{meas}$ for each channel to generate corresponding mean energy values of the photons received by the various detector elements 100 during the various reading periods:

$$E_{mean} = k \frac{E_{meas}}{n_{meas}} \qquad \text{Equation 3}$$

where k is a calibration factor which can be empirically derived based on the operational characteristics of a given system.

Figure 3:
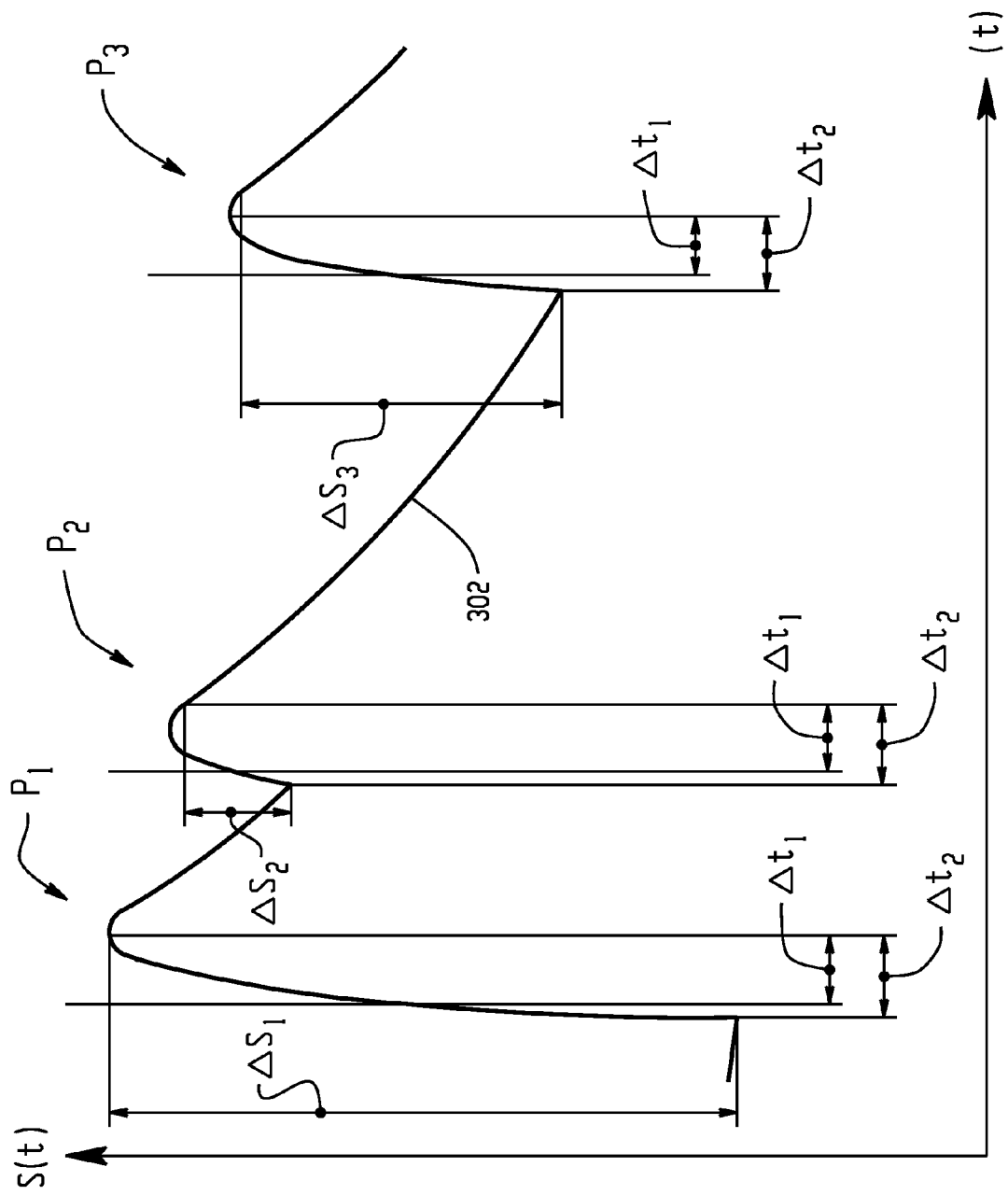
FIG. 3 depicts a detector signal.

Operation will now be further described in relation to FIG. 3, which depicts an exemplary detector signal 302 generated in response to photons P1, P2, and P3. While the precise characteristics of the detector signal 302 are a function of the detector elements 100 and the associated electronics, the signal generated in response to a photon is typically characterized by period in which signal magnitude rises relatively rapidly, followed by a relatively slower decay. Accordingly, the delay times $\Delta t_1$ and $\Delta t_2$ are selected based on the characteristics of the detector elements 100 and the associated electronics. More particularly, second delay time $\Delta t_2$ determines the time period over which the detector signal change determiner 210 calculates the signal difference ΔS. As illustrated, the second delay time $\Delta t_2$ is selected to approximate the time period of the rising signal portion of the signal 302 (i.e., the time period over which the magnitude of the signal 302 increases) in response to the receipt of a photon by the detector element 100. For practical photon counting detectors and/or scintillator materials, the delay time $\Delta t_2$ is in the range of about 2 to 20 nanoseconds (ns).

The first delay Δt1 is used to synchronize the operation of the sampler 212 with the detection of the photons Pi so that the signal differences $\Delta S_i$ are sampled during the time period of the rising signal portions. Thus, the various signal differences $\Delta S_i$ correspond to the rise signal net magnitudes of the detected photons $P_i$. Of course, the average accuracy of this correspondence is affected by the input photon count rate.

One advantage of such a technique is that the photon count and total energy measurements tend to be affected by pileups and noise thresholding in a similar way. As a consequence, the mean energy calculation is accurate over a relatively wide dynamic range. Moreover, both measurements are insensitive to the relatively longer detector decay time component (sometimes also referred to as 'afterglow' effect), which can cause a residual signal from photons received in a first reading period to contribute to the signal level in subsequent reading periods. As a result, the described technique is relatively unaffected by these residual signals, especially when compared to techniques which integrate the detector signal over the reading period.

Figure 4:
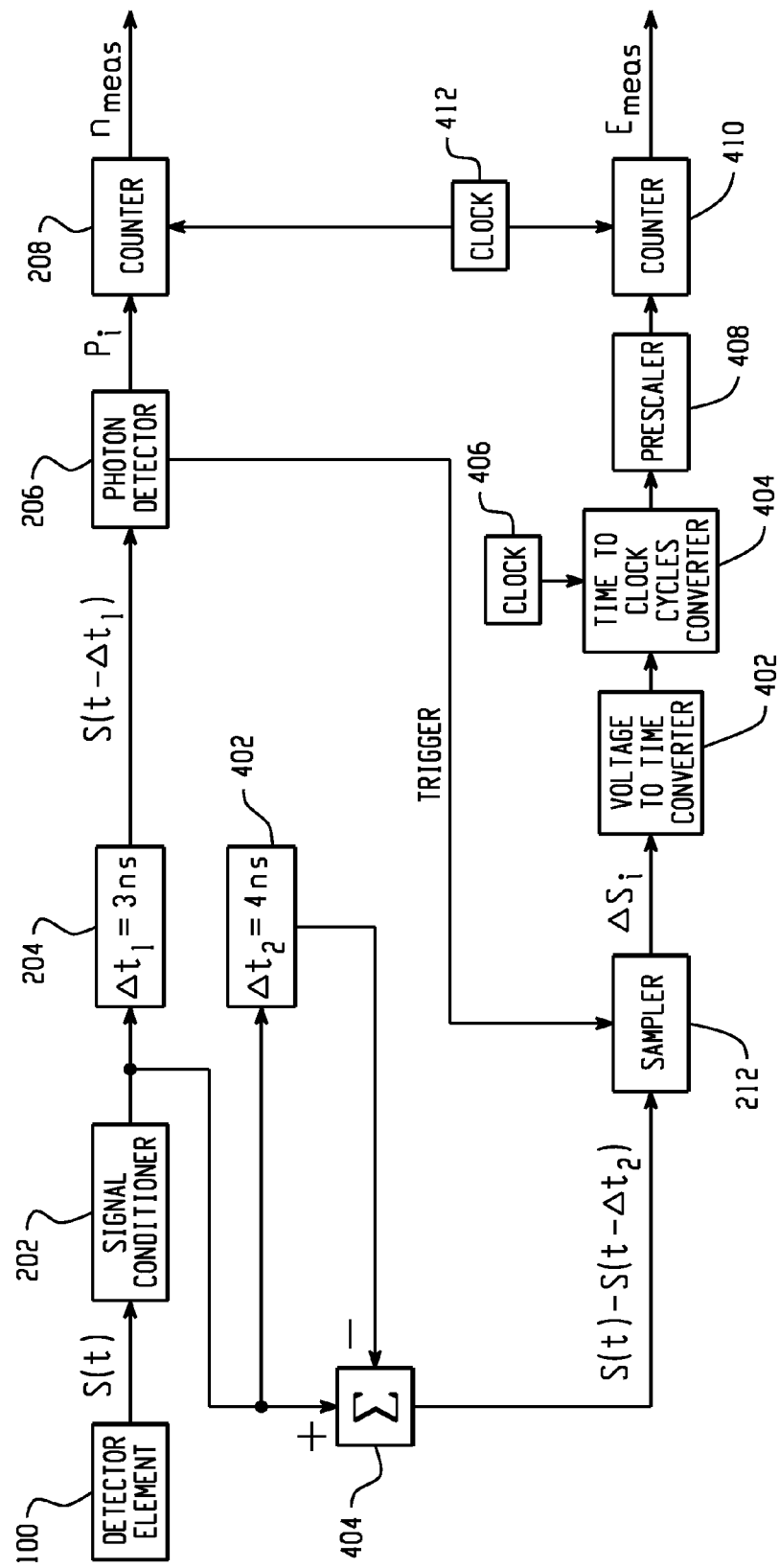
FIG. 4 is a block diagram of an energy discrimination apparatus.
Figure 5:
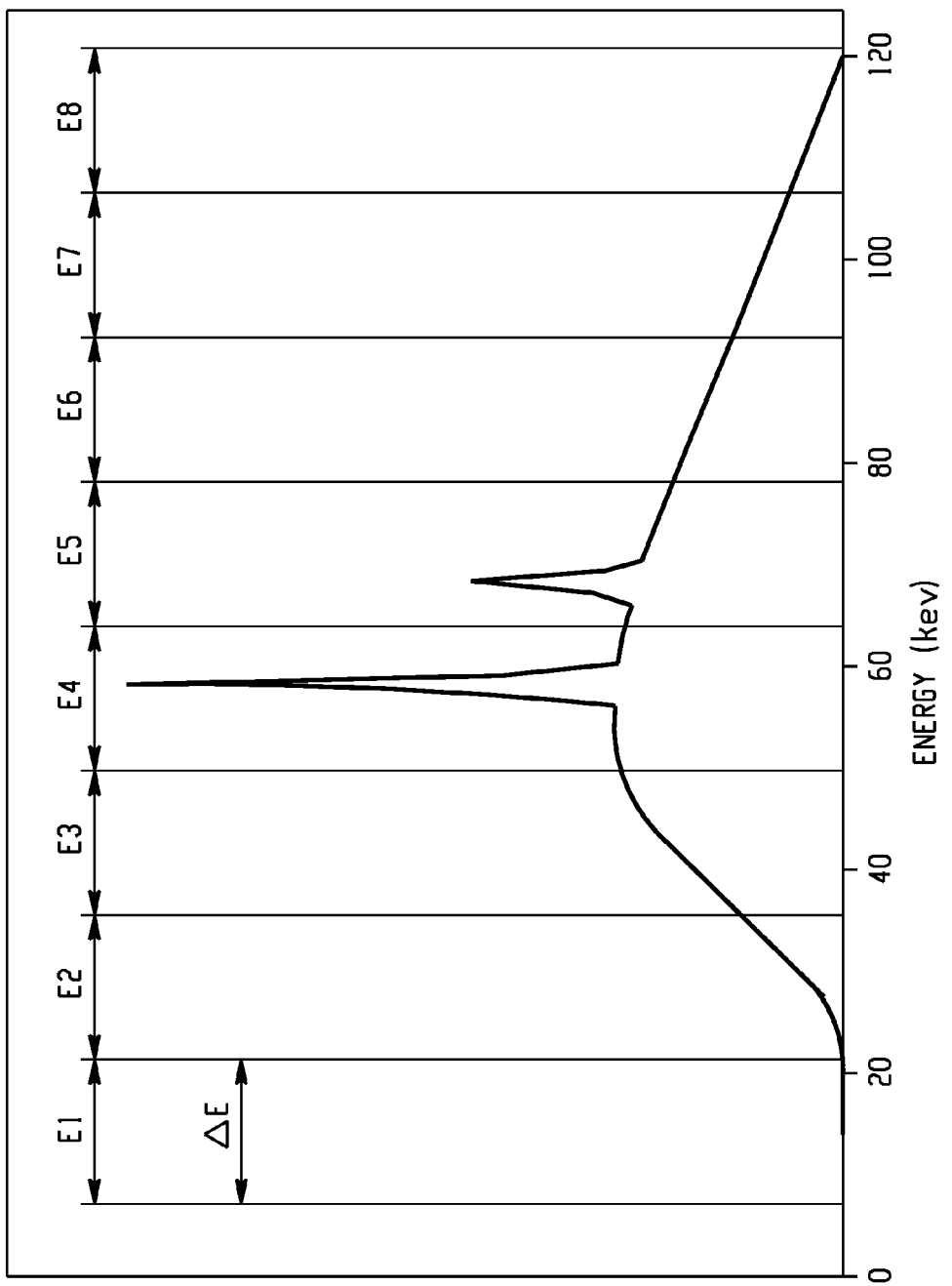
FIG. 5 depicts an energy encoding scheme

FIGS. 4 and 5 depict a block diagram and energy encoding scheme of one possible hardware implementation. Of course, this configuration is an example only and other configurations are also possible. The values of the various parameters are given in order to demonstrate the orders of magnitude of time periods and rates which might be encountered in a typical system.

As illustrated, the first time delay element 204 provides a delay $\Delta t_1$ of about 3 nanoseconds (ns), while the photon detector 206 is implemented as a rising signal detector having a forced dead time of 10 ns. The detector signal energy change determiner 210 is implemented using a delay element 402 which provides a delay $\Delta t_2$ of about 4 ns and a subtractor 404.

FIG. 4 also depicts a suitable technique for summing the various samples $\Delta S_i$. As illustrated, the system includes a voltage to time converter 402, a time to clock cycles converter 404, a first clock 406, a prescaler 408, a second counter 410, and a second clock 412. The voltage to time converter 402 converts the sample signals $\Delta S_i$ to pulses having a temporal length which is proportional to the magnitude of the sample signal $\Delta S_i$. The time to clock cycles converter 404 operates in conjunction with the first clock 406 to generate a number of pulses which is proportional to the length of the pulse generated by the voltage to time converter 402. For example, the first clock 406 may be implemented as a 1 Gigahertz (GHz) clock and the voltage to time converter 402 configured so that the pulse length generated in response to the maximum expected magnitude of the sampled signal ΔSi corresponds to eight (8) cycles of the clock 406.

A second counter 410 operates in conjunction with the second clock 412 to count the pulses generated by the time to clock cycles converter 404. The prescaler 408, which is disposed between the time to clock cycles converter 404 and the input of the second counter 410, serves as a frequency divider and thus allows the use of a relatively lower speed counter 410. Where the prescaler 408 is implemented as a 3-bit (i.e., divide by 8) prescaler, a suitable second clock 412 speed would be on the order of 100 Megahertz (MHz), and the first 208 and second 410 counters could be implemented as a 16-bit synchronous counters. Alternatively, asynchronous counters can be used without the need for clock 412.

FIG. 5 depicts the relationship between photon energy and the encoding scheme in greater detail. In the present example, the energy range from about 5 to 120 keV is encoded into eight (8) energy ranges or bins E1 through E8, with each bin having a width ΔE. Note that the pulse width generated by the voltage to time converter 402 should be established so that the energy bin E1 is encoded as one (1) clock cycle, the energy bin E2 is encoded as two (2) clock cycles, and so on.

The count value generated by the second counter 410 can readily be rescaled to correspond to the desired energy units. According to one technique, the output of the second counter 410 is multiplied by the prescaler 408 dividing factor. In an implementation where the counts remaining in the prescaler 408 can be retrieved, the remaining counts are added to the result of the multiplication. In an implementation in which the remaining counts are not retrievable, the remaining counts may be approximated by adding a number of counts which corresponds to one-half (½) of the prescaler 408 dividing factor to the result of the multiplication. The result is then multiplied by the known energy bin width ΔE and by a known, pre-calibrated factor which converts the sum of the rise signal net magnitudes to the total photon energy in the desired units.

Variations are contemplated. While a particular advantage of the photon counting and energy measurement techniques described is their relative simplicity, other techniques may also be implemented. For example, while the overall energy measurement accuracy is a function of statistical factors, the accuracy of the overall energy measurement is also influenced by the accuracy of the rise signal net magnitude measurement. The accuracy of the energy measurement may be improved, for by example, by dynamically adjusting the first and second delay times $\Delta t_1$ and $\Delta t_2$ as a function of the count rate and/or signal levels so that the sampling corresponds more closely to the beginning of the signal rise and/or the signal peaks. As yet another example, the energy measurement may be performed using other measurement schemes or with greater or lesser resolution.

Figure 6:
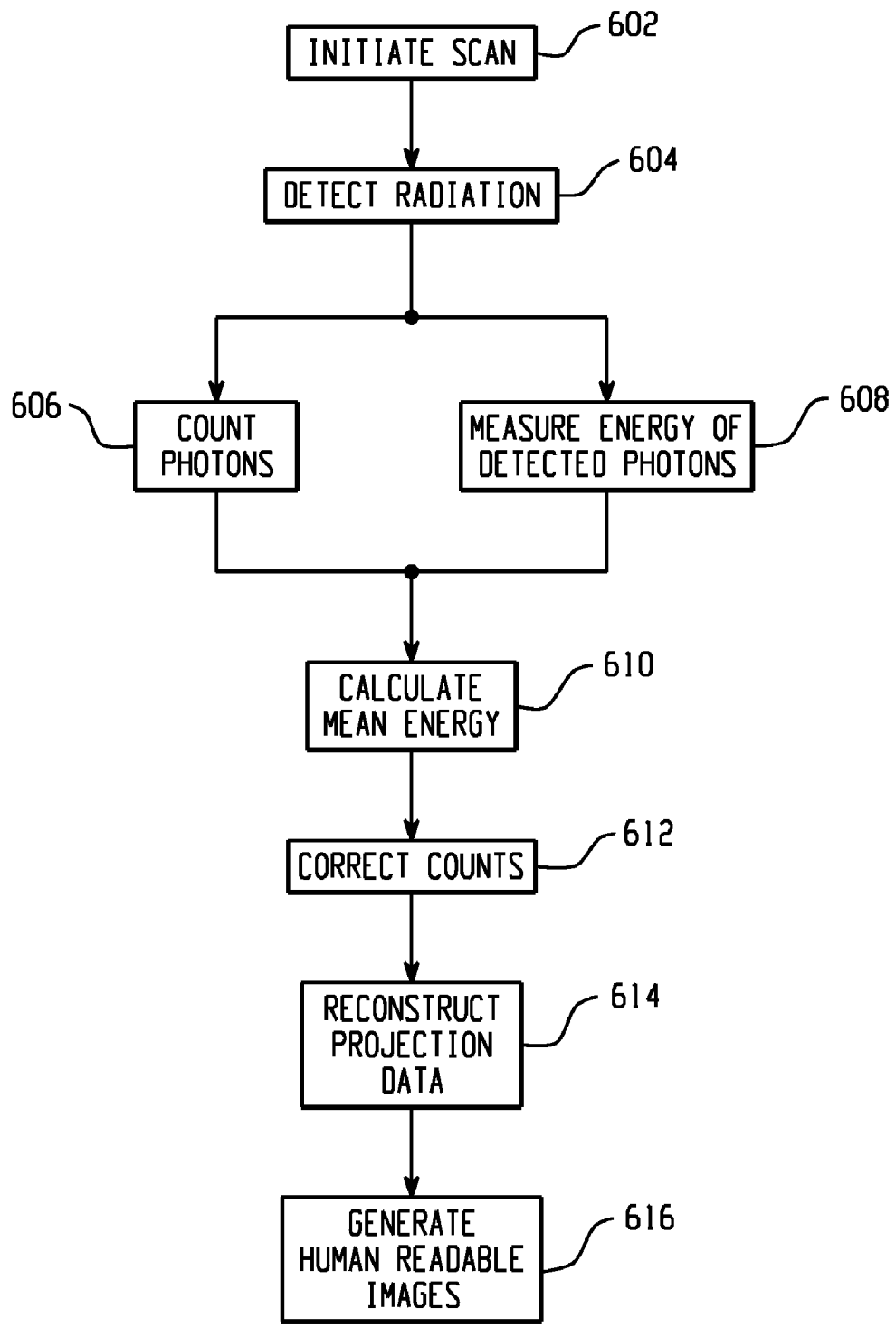
FIG. 6 depicts an imaging method.

Operation will now be described in relation to FIG. 6.

A scan is initiated at 602.

Radiation which has traversed the examination region 14 is detected at 604.

Photons detected during a given reading period are counted at 606, and the energy of the detected photons is measured at 608. The energy may be measured by measuring the detector signal in each of a plurality of discrete sub-periods within the reading period, where the sub-periods correspond to the detection of x-rays. As described above, for example, the energy may be measured by measuring the change in the detector signal in response to the various detected photons.

The mean energy of the detected radiation is calculated at step 610.

At step 612, a corrected photon count value is generated.

The projection data is reconstructed at step 614 using known techniques to generate volumetric data indicative of the radiation attenuation and material composition of the object under examination. Note that the material composition information may be generated, alternately or additionally, in a post-reconstruction operation.

The volumetric image data and or the material composition information are presented in a human perceptible form at step 616, for example by way of human readable images displayed on a monitor or display associated with the operator console 44.

While the foregoing steps have been discussed from the perspective of a single detector element 100 and a single reading period, it will of course be appreciated that data is collected for the various detector elements and over a plurality of reading periods.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus comprising:
    an x-ray detector which generates a signal having a magnitude which varies in response to x-ray photons received by the detector;
    a photon counter which counts x-ray photons received by the detector during a reading period;
    a photon energy determiner which generates an output which represents a total of the changes in the magnitude of the detector signal in response to x-ray photons received by the detector during the reading period, where the total of the changes is a sum of differences between the signal and a delayed signal and where the delayed signal is a delayed version of the signal.

2. The apparatus of claim 1 wherein the magnitude of the signal increases in response to a received photon and the output represents the total of the increases in the magnitude of the signal in response to x-ray photons received by the detector during the reading period.

3. The apparatus of claim 2 including a photon detector which detects a change in the signal indicative of a received photon, and wherein the photon energy determiner measures a change in the magnitude of the signal in response to a signal from the photon detector.

4. The apparatus of claim 1 wherein the photon energy determiner measures a rise signal net magnitude of the signal for each of a plurality of photons received by the detector during the reading period.

5. The apparatus of claim 1 wherein the photon energy determiner includes a detector signal change determiner which measures changes in the signal and a summer which sums the measured changes.

6. The apparatus of claim 5 wherein the detector signal change determiner includes a delay component which delays the signal and a calculation component which calculates the differences between the signal and the delayed signal.

7. The apparatus of claim 1 including an energy calculator which uses the photon count and the output to calculate a value indicative of the energy of the x-ray photons received during the reading period.

8. The apparatus of claim 7 wherein the calculated value is a mean energy.

9. The apparatus of claim 1 including
    an object support which supports an object under examination in an examination region;
    an x-ray source which generates x-radiation from a plurality of angular positions about the examination region;
    a plurality of x-ray detectors, photon counters, and photon energy determiners.

10. A method comprising:
    detecting an x-ray photon received by an x-ray detector element of an x-ray computed tomography apparatus, where the x-ray detector element generates a detector element signal;
    counting the detected photon;
    measuring an energy of the detected photon, wherein the measurement is performed in response to the detection of the photon, where measuring the energy comprises;
        delaying the detector element signal to produce a delayed detector element signal;
        determining a signal difference between the delayed detector element signal and the detector element signal;
        sampling the signal difference; and
        summing a plurality of sampled signal differences;
    repeating the steps of detecting, counting, and measuring for a reading period; and
    generating an output indicative of the number and total energy of the photons received by the detector element during the reading period.

11. The method of claim 10 wherein the step of measuring is performed in temporal synchronization with an increase in the magnitude of a signal generated by the x-ray detector element.

12. The method of claim 10 wherein measuring includes measuring a change in the magnitude of a signal generated by the detector element.

13. The method of claim 12 wherein the change is the rise signal net magnitude of the detector element signal.

14. The method of claim 10 wherein the output includes a mean energy.

15. The method of claim 10 wherein detecting includes identifying a signal generated by the x-ray detector element which is indicative of a received x-ray photon and wherein the measurement is performed in response to the identified signal.

16. The method of claim 10 wherein the detector element signal includes a rising signal portion generated in response to the receipt of a photon by the detector element and delaying includes delaying the detector element signal by a time period which corresponds to the rising signal portion.

17. The method of claim 10 including generating a sum of the measured energy of photons of detected during the reading period and wherein repeating includes repeating the step of generating.

18. A system, comprising:
    a calculation component to calculate a difference between a sensor signal and a delayed sensor signal, where the sensor signal has a magnitude which varies in response to x-ray photons, where x-ray photons received by an x-ray detector during a reading period are counted, and where the delayed sensor signal is a delayed version of the sensor signal; and
    a photon energy determiner to produce an output that includes the difference.

19. The system of claim 18, where changes in the sensor signal are measured, where measured changes are summed together to produce a summation result, and where the summation result is included in the output.

20. The system of claim 18, where the output is used to produce a computed tomography image and where the computed tomography image is caused to be displayed.

21. The system of claim 18, where the output represents, at least in part, a magnitude change in the sensor signal and where the magnitude change is determined, at least in part, from x-ray photons received by an x-ray detector during a reading period.

22. The system of claim 21, comprising:
   an x-ray detector to produce the sensor signal;
   a photon counter to count the x-ray photons received by the x-ray detector during the reading period;
   a detector signal change determiner to measure changes in the sensor signal;
   a summer to sum the measured changes; and
   a delay component to delay the sensor signal.

23. The system of claim 22, comprising:
   a component to use the output to produce a computed tomography image; and
   a component to cause the computed tomography image to be displayed.

* * * * *